Nov. 2, 1965  A. M. TORCHIO IN GATTRUGERI  3,215,048
METHOD AND APPARATUS FOR THE CONTINUOUS MAKING OF VALVED BAGS
Filed Dec. 20, 1962  3 Sheets-Sheet 1

INVENTOR
Anna Maria Torchio in Gattrugeri

BY Michael J. Striker
ATTORNEY

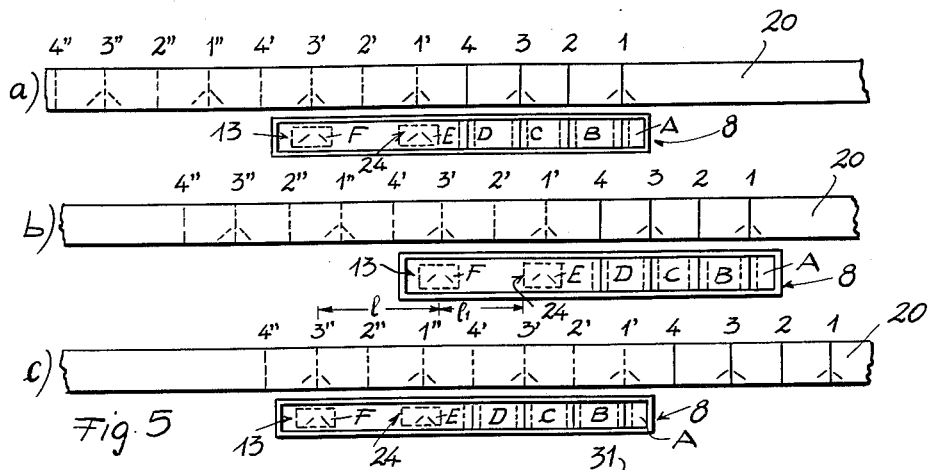
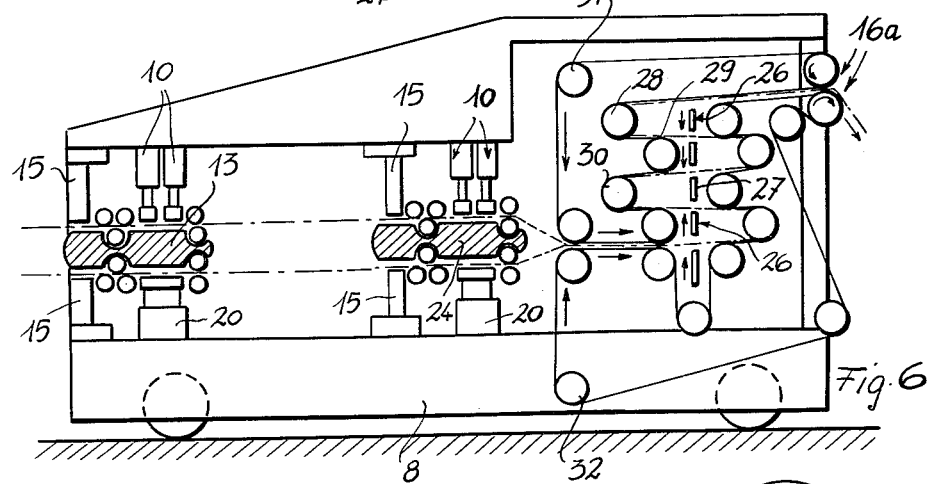
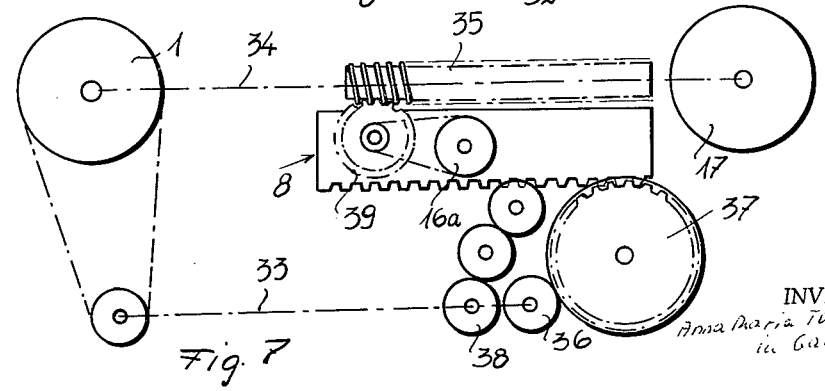

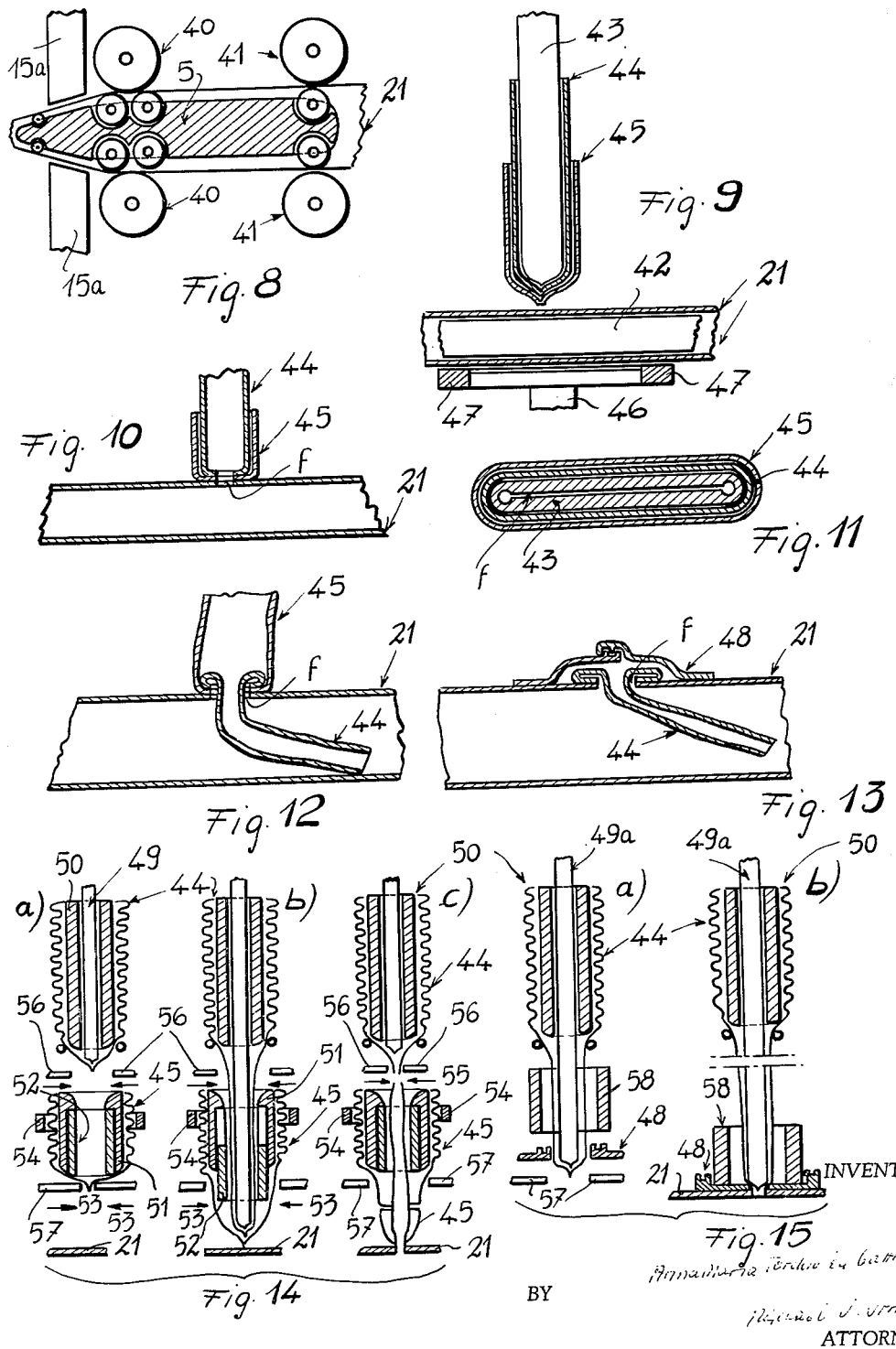

though a further length is introduced between the walls of the bag tubing, to thereby form the valve. After this has been done, the bags have to be cut apart from one another. These discontinuous procedures result in a relatively low production rate, which adversely affects the manufacturing costs.

United States Patent Office 3,215,048
Patented Nov. 2, 1965

3,215,048
METHOD AND APPARATUS FOR THE CONTINUOUS MAKING OF VALVED BAGS
Anna Maria Torchio in Gattrugeri, Galeazzo 31,
Milan, Italy
Filed Dec. 20, 1962, Ser. No. 246,251
Claims priority, application Italy, Dec. 22, 1961,
23,139
19 Claims. (Cl. 93—8)

Valved bags made from tubings of thermoplastics or like materials (or films converted into tubings by welding) are presently manufactured by discontinuous procedures, which results in increased production costs. It is already known to make valved bags, starting with a flat tubing, by cutting from the coil of material a section of suitable size, which is then welded at both ends, after having suitably folded one of such ends, to thereby form the valve. It is also known to make such bags by inserting a length of flat smaller diameter tubing between the walls of formed tubing, and by welding the assembled tubings so as to form a valve, after a sheet of polythene or the like has been introduced into the smaller tubing, to prevent the walls thereof from being welded with one another. All the already known methods and apparatus result in a discontinuous production of bags, i.e. a section having the required length is unwound from the coil of flat tubing, and then cut therefrom, whereafter the required edge welding and valve forming operation are performed. Then, another length is unwound from the coil, and the above operations are repeated, and so on.

The method and apparatus according to this invention is capable of the manufacturing of bags with inserted valves, i.e. with valves formed with a film material different from that of the bags proper, and is characterized in that the flat tubing is continuously unwound from the coil. The sealing of ends of the bags and the welding of a valve to bag is performed, while the flat tubing is unwound and advanced, by means supported by a carriage which is moved at a speed equal to that at which the tubing is unwound. The tubing can, therefore, be considered as stationary relative to the carriage. Moreover the welding of each valve is performed on the outer surface of tubing, and only on one wall thereof, the tubing walls being kept apart in the welding zone by a small slide adequately shaped and dimensioned and fitted inside the tubing. Such divaricating slide also being moved along with the electrode supporting carriage, and at the same speed thereof and of the tubing, while the edge sealing and valve welding operations are performed. Said divaricating slide is introduced into the tubing when a new coil is started, is thereafter always kept enclosed within the tubing, and is maintained in proper position, by guide rollers e.g., which are connected with the movable carriage, and arranged outside of and spaced from the divaricating slide by the intermediate tubing, in such a manner that the slide is acted upon by said rollers through the interposed wall of tubing.

After the valve is welded on one tubing wall only, against the divaricating slide, by which the tubing walls are supported and kept apart, and the bottom edge is welded by another electrode suitably spaced beyond the divaricating slide, both the bottom and the valve welding electrodes are lifted, and the motion of the carriage by which they are supported, is reversed. Thus, while the film tubing continues to be unwound and advanced in the same direction, the carriage is brought back to its starting point, pulling along with it the divaricating slide located within the tubing, and which is guided by the aforesaid guide rollers, which rollers might be arranged to exert a magnetic action, for bringing said slide back to its starting point. The stroke of the electrode supporting carriage is then again reversed, and the carriage caused to move in the direction of the advancing tubing at the same speed thereof. The electrodes are moved downward, for welding the valve to a subsequent bag, and for sealing the leading edge thereof as well as the trailing edge of the preceding bag, to which a valve was welded in the preceding operation. To be able to do all this, the electrode by which the edges are sealed, must be of the so-called "welding-cutting-welding" type.

In order to facilitate the return of the divaricating slide to its starting position, a further stationary slide, i.e., one not guided by rollers connected with the electrode supporting carriage, is positioned within the film tubing in order to keep the walls thereof spaced apart while the movable divaricating slide is advanced along with the tubing, during the welding operation and, even more important, while the movable slide is returned to its starting position in a direction opposite to that of tubing travel and possibly at a higher speed.

When it is desired to increase the bag production rate, the speed at which the tubing is unwound should be increased, however since the bag length is fixed, the time available for the welding operations might become insufficient. Therefore, when it is desired to increase the production rate, both the electrode supporting carriage, and the divaricating slide should be caused to follow the tubing unwinding motion for a period of time equivalent to the time required for unwinding of a tubing length which exceeds the length of a bag. For such purpose, the length of the electrode supporting carriage may be increased, and further, suitably spaced electrodes, designed for the welding of valves and bottoms, added thereto, whereby more bags can be simultaneously operated on, care being taken to have the bags directed opposite to each, i.e. in such a manner that successive bags will come out of the machine alternately with their valve end and bottom end respectively. Moreover, the carriage return speed might be increased. The above described method and apparatus allows the making of bags provided with different types of inserted valves. The method and apparatus of the present invention is particularly suitable for making bags with valves of the already known inserted, or "stamp" type. However, said method and apparatus is also very suitable for making bags provided with a new type of valve, which forms one object of this invention. Such valve may be formed by welding a further, suitably dimensioned tubing length, to the outside of and perpendicular to one wall only of bag tubing, along the whole closed line defined by the periphery of said tubing length, and simultaneously cutting the wall of bag tubing inside of said welded line, so that the tubing section, welded perpendicularly on the outside of the bag after having been turned upside down into the inside of the bag forms a valve.

When required, two concentric tubing sections can be welded perpendicularly onto the outside of the bag. After the welding and cutting operations, the inner one of said sections may be turned to the inside, while the outer one might be also turned to the inside, to form a double valve, or may be left on the outside, to form a safety closure that can be sealed for guarantee purposes. Moreover, a slide fastener, welded to the bag in such a manner as to surround the inner tubing section, might be substituted for the outer tubing section.

The novel features which one considered as characteristic of the invention are set forth in particular in the appended claims. The improved method and apparatus for the continuous making of valved bags, together with the additional features and advantages thereof will be best understood from the following detailed description with reference to the accompanying drawings in which:

FIG. 5 is a diagrammatic representation of the sequence of operations according to my invention;

FIG. 6 is a somewhat schematic elevational view of a modified machine embodying my invention;

FIG. 7 is a schematic view of an arrangement in accordance with my invention for preventing tubing from stretching or slackening during acceleration or deceleration of the carriage;

FIG. 8 is an elevational partly vertical sectional view of a divaricating slide arrangement in accordance with the present invention;

FIG. 9 is a vertical section through the portion of the bag and valve section prior to welding of the two in accordance with the present invention;

FIG. 10 is a vertical section through a portion of a bag after the valve has been welded thereto;

FIG. 11 is a horizontal section through the valve portion and the electrode in position for welding the same;

FIG. 12 is a vertical section through a portion of a bag and valve, the inner portion of which valve has been pushed into the bag;

FIG. 13 is a vertical section through a portion of a bag with a modified valve arrangement;

FIG. 14 is a vertical section through a modified valve welding electrode arrangement in accordance with my invention;

FIG. 15 is a vertical section through still another modification of the valve welding arrangement of the present invention.

Figure 1:
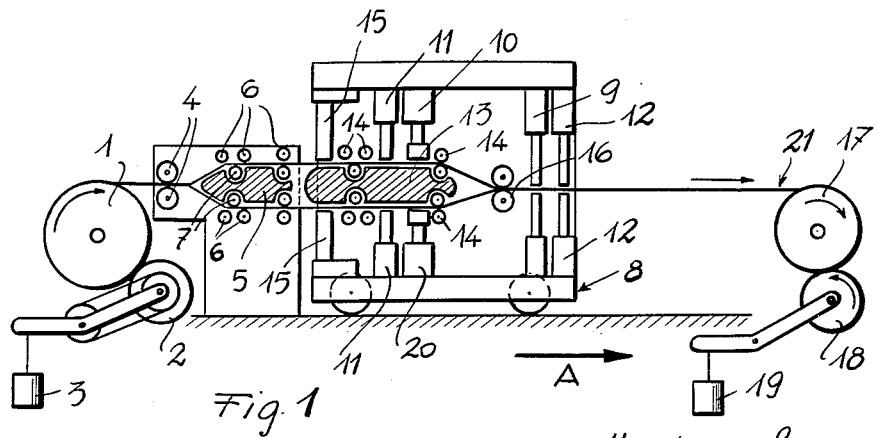
FIG. 1 is a somewhat schematic elevational view of a continuous bag welding machine which embodies my invention and which illustrates the movable carriage in one end position thereof.

The aforesaid method and apparatus are diagrammatically shown in FIG. 1 of said drawings, wherein tubing coil 1, may be unwound by any one of the already known means, e.g. as shown in FIGURE 1, by a revolving roller 2, pressed thereagainst by a weight 3. The unwinding of the coil is assisted by a pair of pulling rollers 4. A stationary divaricating slide 5, is located inside the tubing, and is guided and supported by rollers 6, which are arranged in such a manner as to act as stops. The roller 6 engage rollers 7, which are connected with slide 5 so that, while the tubing which is being fed from coil 1 is allowed to pass all around said slide, the latter is prevented from following the tubing motion.

The movable carriage 8, carries an electrode 9 of the welding-cutting-welding type, i.e. one by which the bottom of the bag—to which at the same time a valve is welded by an electrode 10—is sealed, while simultaneously welding the bottom of bag to which a valve was welded by the electrodes 10 in the previous step. Rods 11 and 12 which are brought down simultaneously with the electrodes 9 and 10, to prevent the film from being subjected to tension stresses while being welded. Divaricating slide 13 located within the tubing and supported and guided by the rollers 14, which are connected to the movable carriage 8 so as to act as stops, in such a manner that slide 13 is forced to maintain its position relative to the carriage, irrespective of whether the carriage is being moved along with the tubing, is kept stationary, or is being brought back to its starting position. Electromagnets 15 are secured to carriage 8, and act upon slide 13 through the tubing wall. A pair of rollers 16 again flatten the tubing after it has passed beyond the divaricating slide 13. The finished bags are wound on a reel 17. A driving roller 18 is arranged with a counterweight 19 to contract reel 17. The reel 17 may be dispensed with, when the bags are to be produced as single units, i.e., severed from one another.

Assume that the work is started from the position as shown in FIG. 1, i.e., after divaricating slides 5 and 13 have been introduced into the tubing through its free, open end, and after they have been adjusted from the outside to their proper positions by means of the rollers 6 and 14. Then the retainers 11 and 12 are depressed, together with the electrodes 9, by which the tubing walls are sealed, and with the electrodes 10, by which the valve is welded to the tubing. The welding taking place against the divaricating slide 13 which acts as a support, while keeping the tubing walls apart. A counterelectrode 20, relieves the bottom rollers 14 from the welding pressure, and serves to complete the welding circuit (when an electric welding machine is used). Thus, simultaneously with the making of the required welds tubing is unwound from coil 1 by means of rollers 2 and 4, is wound on reel 17 by means of roller 18, and carriage 8 is moved to the right (in the direction of arrow A) at the same speed with which the film tubing is being unwound and fed through the remainder of the apparatus. Since no relative motion of carriage 8 to the tubing takes place, the slide 13 also moves to the right together with carriage 8 since, apart from being subjected to the action of rollers 14 and magnet 15 which are suitably located for such purpose, slide 13 will be clamped by the retainers 11 and 12, and by the electrodes 10, 20 and 9, which are connected to the carriage. In this manner, workmanlike welds are obtained by the action of the electrodes, carriage 8 and slide 13, which may be considered as a self-contained unit. At the end of the welding operations, the carriage—traveling together with the film tubing—will have attained the position shown in FIG. 2. Then the electrodes 10, 20, 9 and the retainers 11, 12 are lifted, and the carriage 8, after having been momentarily stopped, is brought back to its starting position, as shown in FIG. 1, while the slide 13, inside the tubing, is also brought back to its starting position, by following the travel of carriage 8, due to the action exerted by the rollers 14 thereon, and to the pulling action exerted by the electromagnets 15 through the wall of tubing 21. During said return stroke, the rollers 16, and possibly the rollers 14, which do not rotate when the carriage 8 is moved to the right together with the tubing, will rotate at a peripheral speed equal to the speed differential between the carriage 8 and the tubing 21, which tubing is continuously advanced in the same direction. As soon as the carriage 8 and the slide 13 have reached the starting position as shown in FIG. 1, they will be momentarily stopped, whereafter their direction of motion is revised and they move forward at the same speed as the tubing, ready for the subsequent bag to be welded by the action of retainers 11, 12, and of the electrodes 12, 20 and 9.

Figure 3:
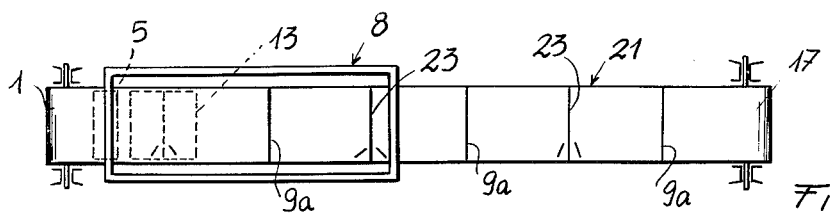
FIG. 3 is a somewhat schematic plan view of a modified version of the machine of FIGS. 1 and 2.
Figure 4:
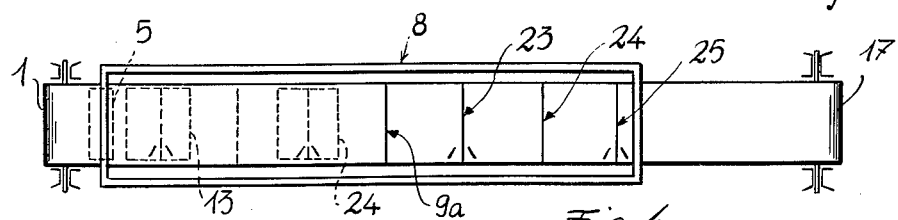
FIG. 4 is a somewhat schematic plan view of another modification of the machine which embodies my invention.

To increase the production rate, the speed at which the tubing is unwound from the coil must be increased, without, however, decreasing too much the time available for the welding operations, i.e., the time during which the carriage 8 is travelling forward together with the tubing. To such a purpose, and keeping in mind that the return speed of carriage 8 is independent of the speed at which the tubing is unwound, and that therefore the carriage speed can be increased over the tubing speed, the length of carriage 8 may be increased, so that the carriage may be provided with another electrode to weld another valve. The carriage may be provided with still a further electrode, spaced from the preceding electrode 9 a distance equal to the length of the bags that are being made, whereby the bags can be formed in a head-to-tail arrangement, as shown in FIG. 3, i.e. by simultaneously welding two valves to two successive bags, with the aid of an adequately dimensioned divaricating carriage 13, while at the same time sealing the bottom 23 of a bag section not yet provided with a valve, and the bottoms 23 of the bags which were already provided with a valve during the preceding forward stroke of said carriage. By such a procedure, the time available for performing the welding operations is equal to that required for unwinding a tubing length sufficient for two bags, less the time taken by the carriage return stroke accomplished at a speed greater than that at which the tubing is being unwound. When a yet greater production rate is required, the length of carriage 8 may be further increased, providing also a further movable divaricating slide 24, in the sequence as shown in FIG. 4. In this embodiment four valves can be simultaneously welded on the slides 13 and 24, spaced by a distance equal to the length of two bags, while the bottoms 9a, 23, 24 and 25 are also simultaneously sealed. By such a procedure, a further increase in the time available for the welding operations is obtained, being the resulting time equal to that required for unwinding a tubing length sufficient for 4 bags, less the time taken by the carriage 8 to return to its starting position. The sequence of operations is shown most clearly in FIG. 5. The carriage 8 is represented diagrammatically in an initial position at A), the electrodes A, B, C, and D, are arranged to perform cross welds (i.e. to seal the bag bottoms) on the tubing, in the positions 1, 2, 3, and 4, respectively, and the electrodes E and F are arranged to weld the valves in the positions 1' and 3'. In the position of FIG. 5b, the film tubing and the carriage 8 have moved a distance l, shorter than the total length of four bags, to the end stroke position of carriage 8, whereafter the carriage is returned to its starting position at a speed such that the distance l is covered in a time shorter than that required by the tubing to have a distance $l_1$ in the opposite direction $l_1+l$ being equal to the total length of four bags. At the end of such time, the carriage 8 is back in its starting position, and the components are in the mutual positions as shown in the FIG. 5c; thus, the tubing is welded crosswise by the electrode A in the successive positions 1, 1', 1" and so on; by the electrode B in the successive positions 2, 2', 2" etc., by the electrode C in the successive positions 3, 3', 3" etc., by the electrode D in the successive positions 4, 4', 4" etc., while the valves are welded to tubing, supported by the slide 24 by the electrodes E (by which no crosswise welds are effected!) in the successive positions 1, 1', 1" etc., and by the electrodes F (which also do not perform crosswise welds!) in the successive positions 3, 3', 3" etc. It must be borne in mind that no valves are present in the positions 2, 2', 2" etc. and 4, 4', 4" etc.

When it is desired to limit the length of carriage 8, recourse may be had to the arrangement, shown in FIG. 6 wherein the tubing, after having passed beyond the slides 13 and 24, is caused to perform a reciprocating motion; in such a case, to prevent stretching of the tubing, due to tension stresses, it must be supported by wire cloths, such as used in the continuous machines for paper making. An advantage of the latter procedure resides in the possibility of making a single electric seal of bag bottoms by means of a series of electrodes as shown in FIGURE 6, wherein the electrodes 26, after having been brought together against the central electrode 27, will perform the crosswise welds by which the bag bottoms are sealed. The rollers 28, 29, 30, 31, 32 may be adjustable so as, to vary the bag sizes. Movable divaricating slides 13 and 24, whereon the valves are welded, are spaced apart by a distance equal to the length of two bags. Their spacing may be changed, together with that of electrodes 10, to vary the bag sizes.

FIG. 7 diagrammatically shows an arrangement designed to prevent the tubing from being stretched or slackened during the accelerations or decelerations of carriage 8 while the later is approaching the dead center positions in which its motion is reversed, i.e. to assure that the speed of rollers 16a by which the tube supporting wire cloth are driven, is always equal to the relative speed between carriage 8 and the tubing. In FIG. 7, the driving shaft 33 drives the shaft 34, by which the coils 1 and 17 (i.e. the unwinding, and winding coils, respectively) are driven. A worm 35 is keyed to shaft 34, and therefore rotates at a speed proportional to that at which the tubing is unwound. The forward stroke of carriage 8 is also controlled by the driving shaft 33 through a pinion 36 and a gear 37, and the transmission ratios are such that the carriage is advanced at a speed equal to that of the tubing. The quick return of the carriage, back to its starting position, is also controlled by the driving shaft 33, through a pinion 38. The pinions 36 and 38 are loosely supported on the shaft 33, and can be locked thereon by means of suitable couplings, one at a time, for alternately advancing and returning the carriage. A spiral gear 39, in mesh with the worm 35 (which as already stated, is rotated at a speed proportional to tubing unwinding speed) drives the rollers 16 by which the tubing is pulled forward. By assuming that the gear 39 is driven in a clockwise direction by the worm 35, then when the carriage 8 is stationary, the rollers 16 will rotate at a speed proportional to that of the tubing; conversely, if the carriage 8 is travelling to the right at a speed equal to that of the tubing, the gear 39 does not turn, and the pulling rollers 16 remain stationary, while when the motion of carriage 8 is reversed, the gear 39 will turn in a clockwise direction at a speed equal to the sum of tubing and carriage speeds, whereby the tubing is pulled forward at a speed proportional to the relative speed between carriage 8 and the tubing.

A divaricating slide 5a, provided with rollers in order to reduce the friction between it and the tubing which it spreads open, is shown in FIG. 8. Rollers 40 and 41 are provided on movable carriage 8 when it is desired that the slide 5 in FIG. 8, follow the stroke of the carriage; conversely, they are not supported by the carriage; conversely, they are not supported by the carriage when the slide is merely to perform a function similar to that of slide 5 in FIG. 1. Rollers 40 are adjusted after the introduction of the slide into the tubing at the start of a new coil, in such a manner as to prevent the slide from being moved relative to carriage 8, as a result of pull exerted thereon by the moving tubing, which slides therearound while the carriage 8 is returned to its starting position, electromagnets 15a are provided on the carriage 8, for pulling the slide along with the carriage 8, and keeping it stationary relative thereto.

A manner in which the bag can be fitted with the special type of valve, which forms a part of this invention is shown in FIG. 9. A portion 42 of a divaricating slide is shown inside tubing 21, and an electrode 43 of the weld-out-weld type (a cross-sectional view of which is shown in FIG. 11) is arranged to weld the valve to the upper wall of tubing 21. Two lengths of adequately dimensioned film tubing 44 and 45, separate from the main tubing by which the bag is formed, have sealed lower ends which are slipped, one above the other, over the electrode 43, like a hood. A counter-electrode 46, cooperates with electrode 43 to keep the tubing tightly against both faces of slide 5. The counterelectrode 46 in the shape of a large area plate is designed to balance the pressure exerted by the electrode 43, which would otherwise be transmitted to the bottom rollers 40 and 41, by which the divaricating slide 5 is supported; it serves also to complete the electric circuit when an electric welding machine is utilized. Some of the heat generated during the welding operation inevitably reaches the portion of tubing interposed between 46 and the slide 5; however, due to the large area of counterelectrode 46, no prejudicially high temperatures are attained; the depth of penetration of counterelectrode 46 into the tubing wall is also negligible, and may be reduced even further by having the electrode 46 surrounded by a ring 47 of nonconductive material which may be arranged so as to protrude beyond the edges of counterelectrode 46; since ring 47 is pressed against a non-heated member, no indentations are caused by it, thus also preventing electrode 46 from indenting the underlaying plastic material. When electrode 43 is depressed, the tubing lengths 44 and 45 are welded by their sealed portion to the overlying wall of tubing 21; after such welding operation, a valve is formed, as shown respectively in a cross-sectional view in FIG. 10, and in a plan view in FIG. 11, i.e. the tubing lengths 44 and 45 are welded to a wall of bag 21 all along the hatched area, which area represents the indentation of the electrode 43. Simultaneously the cut f is made on the bottoms of tubing lengths 44 and 45, and on the upper wall of tubing 21. Then, the inner tubing length 44 is turned into the inside of the bag through the cut F, as shown in FIG. 12, while the outer tubing length 45 may be left on the outside, to form a second safety closing, which might be sealed for added safety, or which may also be turned into the inside of the bag so as to form a double valve. Obviously, the tubing length 45 could be entirely omitted, so that only a single valved bag is formed, or a plastics slide fastener 48 (that can be closed after the bag is filled) may be welded to the bag in place of tubing length 45, as shown in FIG. 13, by means of an electrode fitted concentrically to electrode 43.

Figure 2:
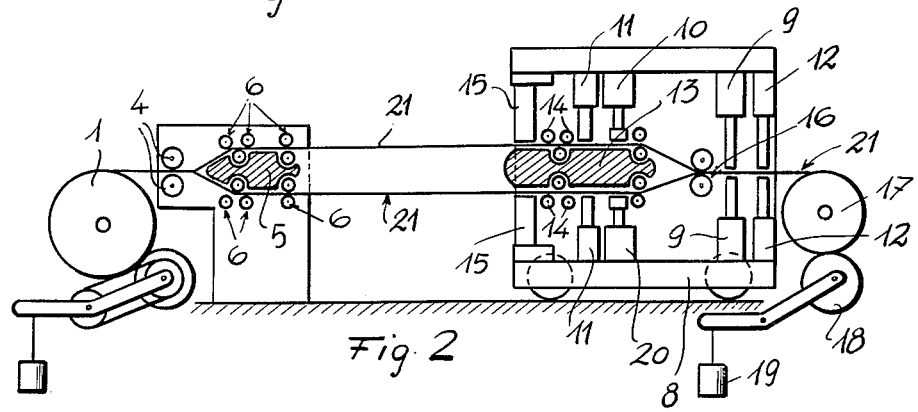
FIG. 2 is a somewhat schematic elevational view of the machine illustrated in FIG. 1 with the carriage in its other end position.

A method for the automatic welding of the double valve as shown in FIGS. 9, 10, 11 and 12, is disclosed by FIG. 14. Such method, which is also an object of this invention, is based on the assumption that the outer component 45 of the valve, is to be made shorter than the inner component 44, for reasons of economy. Conversely, if the above purpose is not in view, both the method and the apparatus can be simplified, since both tubing lengths 44 and 45 could then be simultaneously punched, so as to have an equal length. The electrode 49 is slidingly fitted inside of a hollow sleeve 50, whereon the film tubing 44, designed to form the valve component that shall be then turned inside of the bag, is slipped in the form of an axially compressed hose. The lower end of tubing 44 is sealed, thereby covering the sleeve 50 and the electrode 49. A further sleeve 51 of magnetic material, is provided to receive tubing section 45 which is slipped thereover, tubing section being designed to form the outer valve, which since it normally remains on the outside of the bag may be made shorter than the section 44. A further magnetic sleeve 52 is slidingly received, with sufficient clearance, inside outer sleeve 51, a coil 54 is provided, surrounding sleeve 52 so that when the coil is energized, sleeve 52 is prevented from falling downward. The bottom end of tubing section 45 being sealed, hoods both sleeves 51 and 52 as shown in FIG. 14a. When the electrode 49 is depressed, it will, as seen in FIG. 14b, slide within the sleeve 50, pull off the required length of tubing 44, by pushing the sealed end thereof downward, through the concentric sleeves 51 and 52, and at a given point, engaging the sealed end of tubing 45, whereupon further downward movement causes a predetermined length of tubing 45 also to be pulled along. With further downward movement the wall of bag 21, supported by the divaricating silde, is encountered, and the lower ends of sections 44 and 45 are welded thereon, as shown in detail in FIGS. 10 and 11. Simultaneously, coil 54 is de-energized, allowing sleeve 52 to fall downward. Cutters 53 are provided below sleeve 51 and arranged to surround sleeve 52 in its lower position and, when engaged, to press against sleeve 52 so as to cut any tubing material thereon. After the tubing 45 is cut against the sleeve 52, which sleeve prevents tubing 44 from being also cut by the cutters 53 then, as shown in FIG. 14c, the electrode 49 is lifted, and the portion of tubing 44 welded to bag 21 is cut by cutters 55 provided above sleeve 51, while the lower end of tubing 44, still on sleeve 50, is again sealed by the welding electrode 56. When the coil 54 is again energized, the sleeve 52 is caused to be withdrawn within its outer sleeve. Simultaneously electrode carriage 8, as shown in FIG. 2, after all welding operations have been performed, will reverse its travel, to thereby return to its starting positon. The tubular section 44, welded to main tubing 21, is slipped off from the inside of sleeves 51 and 52, and electrodes 57 provided below sleeve 51 are caused to move toward each other so as to weld the bottom of tubular section 45 which is hanging down from sleve 51, as shown in the lower portion of FIG. 14a, and the cycle is re-started as soon as the carriage 8 is returned to its starting position.

An automatic method and apparatus for making a bag such as shown in FIG. 13, is illustrated in FIG. 15, where an electrode 49a is slidingly received in sleeve 50, over which the film tubing 44 is slipped. A hollow electrode 58 is arranged concentrically around electrode 49a. The lower end of film tubing 44 is sealed, and the electrode 49a is hooded by such tubing. A sliding fastener 48, welded at both ends, but open at its central section, is slipped over the end of electrode 49a and over the tubing 44 covering that end. The fastener slider is kept near one end thereof, and between the outer end of the electrode 49a, and the inner end of the electrode 58, as shown in FIG. 15a.

Then, as shown in FIG. 15b, the electrode 49a is depressed, thereby welding the valve tubing 44 on the tubing 21, while the sliding fastener is welded by the electrode 58 onto the tubing 21 along a line concentric to the weld seam of tubing 44 on tubing 21, whereupon, after the electrodes 49a and 58 have been lifted back to position as shown in FIG. 15a, tubing 44 is cut, and its bottom end is sealed, thereby once again covering the electrode 49a and the sleeve 50, whereafter the cycle is re-started.

The method, and the apparatus for carrying out that method, as above outlined, can be greatly simplified when sheet films are used in place of tubular films. Referring again to FIG. 1 a roll of sheet film may be placed behind or over the coil 1, which coil would in such embodiment also consist of a roll of sheet film. The former roll would be unwound by a roller, driven at a speed equal to that of roll 1, and by further rollers similar to rollers 4, e.g. positioned above the rollers 4 shown in the figure, whereby both films can be unwound from their rolls simultaneously, one above the other. The slide 5 could be dispensed with, and the slide 13 replaced by a flat table, secured to carriage 8. The film unwound from roll 1 would travel below said table, and the film unwound from the upper roll (not shown) would travel above and be supported by the table. The magnet 15 would be eliminated.

The valves would be welded unto the upper, flat film by the electrode 10 with the aid of retainer 11, while the bag bottoms would be sealed by the electrode 9 with the aid of retainer 12, after the two films, coming from both stock rolls have been brought into contact with one another by the rollers 16. Two pairs of welding rollers, arranged to be stationary (i.e. not supported by the moving carriage 8) are symmetrically provided on both edges of the moving films, ahead of roll 17, in order to perform a continuous longitudinal sealing of the edges of the flat films to each other after the transverse weld seams have already been made, thereby closing both bag sides.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for continuously making valved bags comprising, in combination,
   carriage means;
   a source of tubing;

feeding means for feeding tubing for forming valved bags from said source of tubing at a predetermined speed in a predetermined direction;
moving means for moving said carriage means from a start position in operative proximity with said tubing in said predetermined direction;
sealing means mounted on said carriage means for forming bags in said tubing during movement of said carriage and said tubing;
valve forming means mounted on said carriage means for forming valves in said bags of said tubing during movement of said carriage and said tubing; and
means for returning said carriage to the start position in a direction opposite to said predetermined direction upon completion of a predetermined number of bags.

2. Apparatus for continuously making valved bags comprising, in combination,
carriage means;
a source of tubing;
feeding means for feeding tubing for forming valved bags from said source of tubing at a predetermined speed in a predetermined direction;
divaricating means mounted on said carriage means and positioned inside said tubing for divaricating the walls of said tubing during movement of said carriage and said tubing;
moving means for moving said carriage means from a start position in operative proximity with said tubing in said predetermined direction;
sealing means mounted on said carriage means for forming bags in said tubing during movement of said carriage and said tubing;
valve forming means mounted on said carriage means for forming valves in said bags in one wall of said tubing during movement of said carriage and said tubing; and
means for returning said carriage to the start position in a direction opposite to said predetermined direction upon completion of a predetermined number of bags.

3. Apparatus for continuously making valved bags comprising, in combination,
carriage means;
a source of tubing;
feeding means for feeding tubing for forming valved bags from said source of tubing at a predetermined speed in a predetermined direction;
divaricating means magnetically suspended on said carriage means and positioned inside said tubing for divaricating the walls of said tubing during movement of said carriage and said tubing;
moving means for moving said carriage means from a start position in operative proximity with said tubing in said predetermined direction;
sealing means mounted on said carriage means for forming bags in said tubing during movement of said carriage and said tubing;
valve forming means mounted on said carriage means for forming valves in said bags in one wall of said tubing during movement of said carriage and said tubing; and
means for returning said carriage to the start position in a direction opposite to said predetermined direction upon completion of a predetermined number of bags.

4. Apparatus for continuously making valved bags comprising, in combination:
carriage means;
a source of tubing;
feeding means for feeding tubing for forming valved bags from said source of tubing at a predetermined speed in a predetermined direction;
a plurality of divaricating means positioned inside said tubing for divaricating the walls of said tubing, said divaricating means including divaricating means mounted on said carriage means and positioned inside said tubing for divaricating the walls of said tubing during movement of said carriage and said tubing;
moving means for moving said carriage means from a start position in operative proximity with said tubing in said predetermined direction;
sealing means mounted on said carriage means for forming bags in said tubing during movement of said carriage and said tubing;
valve forming means mounted on said carriage means for forming valves in said bags in one wall of said tubing during movement of said carriage and said tubing; and
means for returning said carriage to the start position in a direction opposite to said predetermined direction upon completion of a predetermined number of bags.

5. Apparatus for continuously making valved bags comprising, in combination:
carriage means;
a source of tubing;
feeding means for feeding tubing for forming valved bags from said source of tubing at a predetermined speed in a predetermined direction;
fixed divaricating means positioned inside said tubing for divaricating the walls of said tubing;
movable divaricating means mounted on said carriage means and positioned inside said tubing for divaricating the walls of said tubing during movement of said carriage and said tubing;
moving means for moving said carriage means from a start position in operative proximity with said tubing in said predetermined direction;
sealing means mounted on said carriage means for forming bags in said tubing during movement of said carriage and said tubing;
valve forming means mounted on said carriage means for forming valves in said bags in one wall of said tubing during movement of said carriage and said tubing; and
means for returning said carriage to the start position in a direction opposite to said predetermined direction upon completion of a predetermined number of bags.

6. Apparatus for continuously making valved bags comprising, in combination:
carriage means;
a source of tubing;
feeding means for feeding tubing for forming valved bags from said source of tubing at a predetermined speed in a predetermined direction, said feeding means comprising roller means clamping said tubing and means for driving said roller means at said predetermined speed;
moving means for moving said carriage means from a start position in operative proximity with said tubing in said predetermined direction;
sealing means mounted on said carriage means for forming bags in said tubing during movement of said carriage and said tubing;
valve forming means mounted on said carriage means for forming valves in said bags of said tubing during movement of said carriage and said tubing; and
means for returning said carriage to the start position in a direction opposite to said predetermined direction upon completion of a predetermined number of bags.

7. Apparatus for continuously making valved bags comprising, in combination:
carriage means;
a source of tubing;
feeding means for feeding tubing for forming valved bags from said source of tubing at a predetermined speed in a predetermined direction;

divaricating means mounted on said carriage means and positioned inside said tubing for divaricating the walls of said tubing during movement of said carriage means and said tubing;

moving means for moving said carriage means from a start position in operative proximity with said tubing in said predetermined direction;

sealing means mounted on said carriage means for forming bags in said tubing during movement of said carriage means and said tubing;

valve forming means mounted on said carriage means for forming valves in said bags of said tubing during movement of said carriage and said tubing, said valve forming means including means for welding a predetermined length of tubing substantially perpendicularly to a wall of said tubing along the line of intersection of said length of tubing with the wall of said tubing, means for cutting a hole in the wall of said tubing inside said line of intersection, and means for extending said length of tubing through the hole in the wall of said tubing and positioning said length of tubing inside of said tubing; and means for returning said carriage means to the start position in a direction opposite to said predetermined direction upon completion of a predetermined number of bags.

8. Apparatus for continuously making valved bags comprising, in combination, carriage means;

a source of tubing;

feeding means for feeding tubing for forming valved bags from said source of tubing at a predetermined speed in a predetermined direction;

divaricating means mounted on said carriage means and positioned inside said tubing for divaricating the walls of said tubing during movement of said carriage means and said tubing;

moving means for moving said carriage means from a start position in operative proximity with said tubing in said predetermined direction;

sealing means mounted on said carriage means for forming bags in said tubing during movement of said carriage means and said tubing;

valve forming means mounted on said carriage means for forming valves in said bags of said tubing during movement of said carriage and said tubing, said valve forming means including means for welding a pair of concentrically positioned predetermined lengths of tubing substantially perpendicularly to a wall of said tubing along the lines of intersection of said lengths of tubing with the wall of said tubing, means for cutting a hole in the wall of said tubing inside the line of intersection of the inner one of said lengths of tubing with the wall of said tubing, and means for extending at least said inner one of said lengths of tubing through the hole in the wall of said tubing and positioning said inner one of said lengths of tubing inside said tubing; and means for returning said carriage means to the start position in a direction opposite to said predetermined direction upon completion of a predetermined number of bags.

9. Apparatus for continuously making valved bags, comprising, in combination, carriage means;

a source of tubing;

feeding means for feeding tubing for forming valved bags from said source of tubing at a predetermined speed in a predetermined direction;

divaricating means mounted on said carriage means and positioned inside said tubing for divaricating the walls of said tubing during movement of said carriage means and said tubing;

moving means for moving said carriage means from a start position in operative proximity with said tubing in said predetermined direction;

sealing means mounted on said carriage means for forming bags in said tubing during movement of said carriage means and said tubing;

valve forming means mounted on said carriage means for forming valves in said bags of said tubing during movement of said carriage and said tubing, said valve forming means including means for welding slide fastener means and a concentrically positioned predetermined length of tubing within said slide fastener means substantially perpendicularly to a wall of said tubing along the lines of intersection of said length of tubing and said slide fastener means with the wall of said tubing, means for cutting a hole in the wall of said tubing inside the line of intersection of said length of tubing with the wall of said tubing, and means for extending said length of tubing through the hole in the wall of said tubing and positioning said length of tubing inside said tubing; and means for returning said carriage means to the start position in a direction opposite to said predetermined direction upon completion of a predetermined number of bags.

10. Apparatus for continuously making valved bags, comprising, in combination, carriage means;

a source of tubing;

feeding means for feeding tubing for forming valved bags from said source of tubing at a predetermined speed in a predetermined direction;

divaricating means mounted on said carriage means and positioned inside said tubing for divaricating the walls of said tubing during movement of said carriage means and said tubing;

moving means for moving said carriage means from a start position in operative proximity with said tubing in said predetermined direction;

sealing means mounted on said carriage means for forming bags in said tubing during movement of said carriage means and said tubing;

valve forming means mounted on said carriage means for forming valves in said bags of said tubing during movement of said carriage and said tubing, said valve forming means including welding means for welding a predetermined length of tubing substantially perpendicularly to a wall of said tubing along the line of intersection of said length of tubing with the wall of said tubing, said welding means comprising an electrode mounted on said carriage means and inserted into said length of tubing, the electrode of said welding means having a sharpened middle section, means including the sharpened middle section of the electrode of said welding means for cutting a hole in the wall of said tubing inside said line of intersection, and means for extending said length of tubing through the hole in the wall of said tubing and positioning said length of tubing inside said tubing; and means for returning said carriage means to the start position in a direction opposite to said predetermined direction upon completion of a predetermined number of bags.

11. Apparatus for continuously making valved bags, comprising, in combination, carriage means;

a first source of tubing;

a second source of tubing;

feeding means for feeding feeding tubing for forming valved bags from said first source of tubing at a predetermined speed in a predetermined direction;

deriving means for deriving tubing for forming valves for said bags from said second source of tubing;

divaricating means mounted on said carriage means and positioned inside the tubing from said first source of tubing for divaricating the walls of said tubing during movement of said carriage means and said tubing;

moving means for moving said carriage means from a start position in operative proximity with the tubing from said first source of tubing in a predetermined direction;

sealing means mounted on said carriage means for forming bags in the tubing from said first source of tubing during movement of said carriage means and said tubing;

valve forming means mounted on said carriage means for forming valves in said bags of the tubing from said first source of tubing, said valve forming means including welding means for welding a predetermined length of tubing from said second source of tubing substantially perpendicularly to a wall of the tubing from said first source of tubing along the line of intersection of said length of tubing from said second source of tubing with the wall of said tubing from said first source of tubing, said welding means comprising a sleeve inserted into said length of tubing from said second source of tubing and an electrode mounted on said carriage means and inserted into said sleeve for urging said length of tubing from said second source of tubing against said tubing from said first source of tubing, means for cutting said length of tubing from said second source of tubing at a determined distance from said tubing from said first source of tubing, means for cutting a hole in the wall of said tubing from said first source of tubing inside said line of intersection, and means for extending said length of tubing from said second source of tubing through the hole in the wall of said tubing from said first source of tubing and positioning said length of tubing from said second source of tubing inside said tubing from said first source of tubing; and means for returning said carriage means to the start position in a direction opposite to said predetermined direction upon completion of a predetermined number of bags.

12. Apparatus for continuously making valved bags comprising, in combination, carriage means;
a first source of tubing;
a second source of tubing;
feeding means for feeding tubing for forming valved bags from said first source of tubing at a predetermined speed in a predetermined direction;
deriving means for deriving tubing for forming valves for said bags from said second source of tubing;
divaricating means mounted on said carriage means and positioned inside the tubing from said first source of tubing for divaricating the walls of said tubing during movement of said carriage means and said tubing;
moving means for moving said carriage means from a start position in operative proximity with the tubing from said first source of tubing in a predetermined direction;
sealing means mounted on said carriage means for forming bags in the tubing from said first source of tubing during movement of said carriage means and said tubing;
valve forming means mounted on said carriage means for forming valves in said bags of the tubing from said first source of tubing, said valve forming means including welding means for welding a pair of concentrically positioned predetermined lengths of tubing from said second source of tubing substantially perpendicularly to a wall of the tubing from said first source of tubing along the lines of intersection of said lengths of tubing from said second source of tubing with the wall of said tubing from said first source of tubing, means for cutting the outer one of said lengths of tubing from said second source of tubing at a first determined distance from said tubing from said first source of tubing, means for cutting the inner one of said lengths of tubing from said second source of tubing at a second determined distance from said first tubing from said first source of tubing greater than said first determined distance, means for cutting a hole in the wall of said tubing from said first source of tubing inside the line of intersection of the inner one of said lengths of tubing from said second source of tubing with the wall of said tubing from said first source of tubing, and means for extending at least said inner one of said lengths of tubing from said second source of tubing through the hole in the wall of said tubing from said first source of tubing and positioning said inner one of said lengths of tubing from said second source of tubing inside said tubing from said first source of tubing; and means for returning said carriage means to the start position in a direction opposite to said predetermined direction upon completion of a predetermined number of bags.

13. A method for continuously making valved bags, comprising the steps of mounting sealing means and valve forming means on a carriage;
feeding tubing for forming valved bags from a source of tubing at a predetermined speed in a predetermined direction;
moving said carriage from a start position in operative proximity with said tubing in said predetermined direction;
forming bags in said tubing with said sealing means during movement of said carriage and said tubing;
forming valves in said bags of said tubing with said valve forming means during movement of said carriage and said tubing; and
returning said carriage to the start position in a direction opposite to said predetermined direction upon completion of a predetermined number of bags.

14. A method for continuously making valved bags, comprising the steps of mounting sealing means, valve forming means and divaricating means on a carriage;
feeding tubing for forming valved bags from a source of tubing at a predetermined speed in a predetermined direction;
positioning said divaricating means inside said tubing;
moving said carriage from a start position in operative proximity with said tubing in said predetermined direction;
divaricating the walls of said tubing with said divaricating means during movement of said carriage and said tubing;
forming bags in said tubing with said sealing means during movement of said carriage and said tubing;
forming valves in said bags in one wall of said tubing with said valve forming means during movement of said carriage and said tubing; and
returning said carriage to the start position in a direction opposite to said predetermined direction upon completion of a predetermined number of bags.

15. A method for continuously making valved bags, comprising the steps of mounting sealing means and valve forming means on a carriage;
magnetically suspending divaricating means on said carriage;
feeding tubing for forming valved bags from a source of tubing at a predetermined speed in a predetermined direction;
positioning said divaricating means inside said tubing;
moving said carriage from a start position in operative proximity with said tubing in said predetermined direction;

divaricating the walls of said tubing with said divaricating means during movement of said carriage and said tubing;

forming bags in said tubing with said sealing means during movement of said carriage and said tubing;

forming valves in said bags in one wall of said tubing with said valve forming means during movement of said carriage and said tubing; and returning said carriage to the start position in a direction opposite to said predetermined direction upon completion of a predetermined number of bags.

16. A method for continuously making valved bags, comprising the steps of mounting sealing means, valve forming means and movable divaricating means on a carriage;

feeding tubing for forming valved bags from a source of tubing at a predetermined speed in a predetermined direction;

positioning fixed divaricating means inside said tubing;

positioning said movable divaricating means inside said tubing;

moving said carriage from a start position in operative proximity with said tubing in said predetermined direction;

divaricating the walls of said tubing with said fixed divaricating means and with said movable divaricating means during movement of said carriage and said tubing;

forming bags in said tubing with said sealing means during movement of said carriage and said tubing;

forming valves in said bags in one wall of said tubing with said valve forming means during movement of said carriage and said tubing; and returning said carriage to the start position in a direction opposite to said predetermined direction upon completion of a predetermined number of bags.

17. A method for continuously making valved bags, comprising the steps of mounting sealing means, valve forming means and divaricating means on a carriage;

feeding tubing for forming valved bags from a source of tubing at a predetermined speed in a predetermined direction;

positioning said divaricating means inside said tubing;

moving said carriage from a start position in operative proximity with said tubing in said predetermined direction;

divaricating the walls of said tubing with said divaricating means during movement of said carriage and said tubing;

forming bags in said tubing with said sealing means during movement of said carriage and said tubing;

welding with said valve forming means during movement of said carriage and said tubing a predetermined length of tubing substantially perpendicularly to a wall of said tubing along the line of intersection of said length of tubing with the wall of said tubing;

cutting with said valve forming means during movement of said carriage and said tubing a hole in the wall of said tubing inside said line of intersection;

extending said length of tubing through the hole in the wall of said tubing and positioning said length of tubing inside said tubing; and returning said carriage to the start position in a direction opposite to said predetermined direction upon completion of a predetermined number of bags.

18. A method for continuously making valved bags, comprising the steps of mounting sealing means, valve forming means and divaricating means on a carriage;

feeding tubing for forming valved bags from a source of tubing at a predetermined speed in a predetermined direction;

positioning said divaricating means inside said tubing;

moving said carriage from a start position in operative proximity with said tubing in said predetermined direction;

divaricating the walls of said tubing with said divaricating means during movement of said carriage and said tubing;

forming bags in said tubing with said sealing means during movement of said carriage and said tubing;

welding with said valve forming means during movement of said carriage and said tubing a pair of concentrically positioned predetermined lengths of tubing substantially perpendicularly to a wall of said tubing along the lines of intersection of said lengths of tubing with the wall of said tubing;

cutting with said valve forming means during movement of said carriage and said tubing a hole in the wall of said tubing inside the line of intersection of the inner one of said lengths of tubing with the wall of said tubing;

extending at least said inner one of said lengths of tubing through the hole in the wall of said tubing and positioning said inner one of said lengths of tubing inside said tubing; and returning said carriage to the start position in a direction opposite to said predetermined direction upon completion of a predetermined number of bags.

19. A method for continuously making valved bags, comprising the steps of mounting sealing means, valve forming means and divaricating means on a carriage;

feeding tubing for forming valved bags from a source of tubing at a predetermined speed in a predetermined direction;

positioning said divaricating means inside said tubing;

moving said carriage from a start position in operative proximity with said tubing in said predetermined direction;

divaricating the walls of said tubing with said divaricating means during movement of said carriage and said tubing;

forming bags in said tubing with said sealing means during movement of said carriage and said tubing;

welding with said valve forming means during movement of said carriage and said tubing slide fastener means and a concentrically positioned length of tubing within said slide fastener means substantially perpendicularly to a wall of said tubing along the lines of intersection of said length of tubing and said slide fastener means with the wall of said tubing;

cutting with said valve forming means during movement of said carriage and said tubing a hole in the wall of said tubing inside the line of intersection of said length of tubing with the wall of said tubing;

extending said length of tubing through the hole in the wall of said tubing and positioning said length of tubing inside said tubing; and returning said carriage to the start position in a direction opposite to said predetermined direction upon completion of a predetermined number of bags.

References Cited by the Examiner

UNITED STATES PATENTS

| | | | |
|---|---|---|---|
| 2,122,061 | 6/38 | Hoppe | 229—55 |
| 2,660,100 | 11/53 | Doyle | 93—35 |
| 2,944,469 | 7/60 | Heinzer | 93—8 |
| 2,998,340 | 8/61 | Conway et al. | 156—250 |
| 3,040,967 | 6/62 | Klein | 229—625 |
| 3,069,303 | 12/62 | Scholle | 156—253 |

FRANK E. BAILEY, *Primary Examiner.*